July 18, 1967

L. L. LEVENSON ET AL 3,331,526

ULTRAHIGH VACUUM SEAL

Filed July 20, 1964

INVENTORS
LEONARD L. LEVENSON
NORMAN MILLERON
BY
Roland G. Anderson
ATTORNEY

United States Patent Office 3,331,526
Patented July 18, 1967

3,331,526
ULTRAHIGH VACUUM SEAL
Leonard Lionel Levenson, Gif-sur-Yvette, France, and Norman Milleron, Berkeley, Calif., assignors to the United States of America as represented by the United States Atomic Energy Commission
Filed July 20, 1964, Ser. No. 384,013
12 Claims. (Cl. 220—46)

ABSTRACT OF THE DISCLOSURE

The invention provides an ultrahigh vacuum seal comprising a closely-fitting disk that is disposed in the opening to be sealed. An annular inflatable bellows is disposed on the periphery of the disk, so that the bellows lies adjacent the wall which defines the opening to be sealed. In the operation of the seal, the disk is positioned in the opening, and the bellows is inflated by admitting hydraulic fluid under pressure thereto. The pressure of the inflated bellows forces a flexible annular band against the wall of the opening, thereby providing a leakproof vacuum seal.

---

Figure 1:
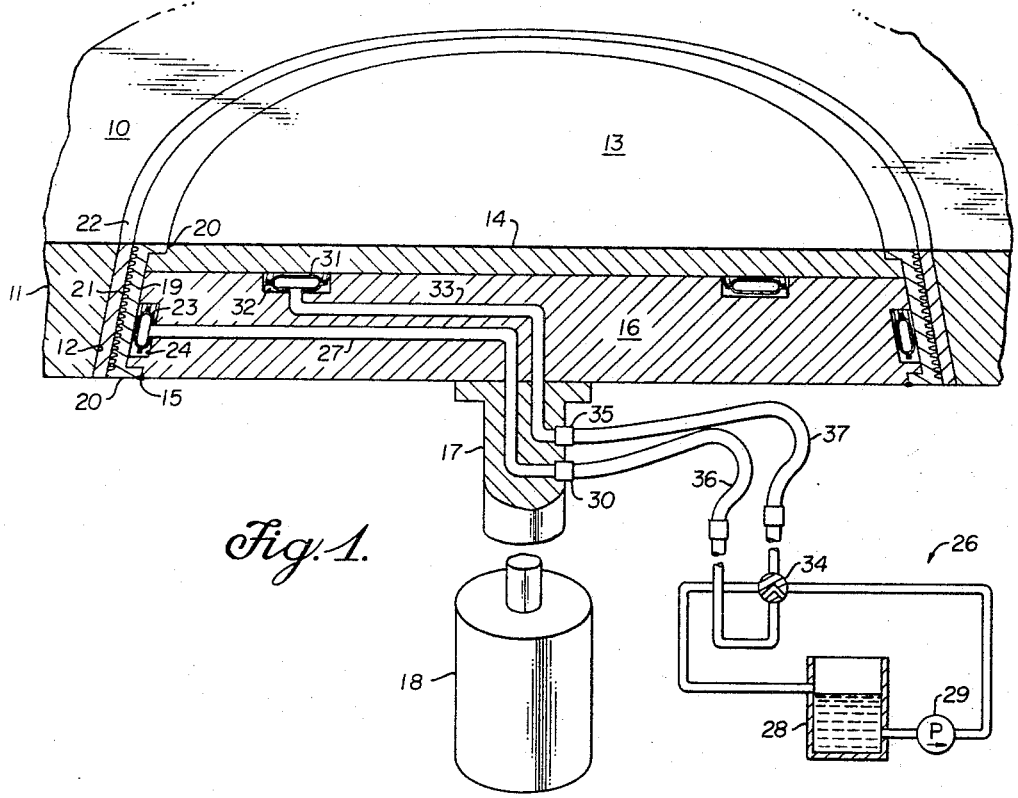

The present invention relates to vacuum systems, and in particular to a vacuum seal for access openings in ultrahigh vacuum enclosures. The invention described herein was made in the course of, or under Contract W–7405–eng–48, with the United States Atomic Energy Commission.

Continuing advances in vacuum technology and the attainment of ultrahigh vacuums have created new problems in sealing the access openings of vacuum systems. Conventional closures are either subject to a degree of leakage that cannot be tolerated in an ultrahigh vacuum system or else have other limitations which are disadvantageous in this context.

Pressures of less than $10^{-8}$ mm. Hg are considered to be in the ultrahigh range and have required new sealing techniques other than the ordinary type of compressible or flexible gasketing. In any vacuum system in equilibrium will be established between the gas flow into the system and the rate of exhaust. This gas inflow may come from several sources, such as desorption of occluded gas from the interior walls of the enclosure, leakage of the gas through the walls or seals of the enclosure, and back diffusion from the vacuum pump. Various measures, known to those skilled in the art, are employed to minimize gas inflow from these causes. One such measure particularly affects the design of the vacuum seals. Specifically, the occluded gas is desorbed from the interior metal walls of the vacuum chamber by baking the metals at a sufficiently high temperature as the chamber is being evacuated. This generally involves heating the seals.

Therefore, in view of the aforementioned facts, a seal for use in ultrahigh vacuum applications must meet two important requirements. First, it must be leak-tight to below some specified limit e.g., less than $10^{-10}$ cc.-STP per second of helium, and, second, it must be made entirely of materials that can be heated to drive out any occluded and adsorbed gases while the system is being evacuated. In addition, it is desirable that the seal be capable of being quickly opened and closed, enabling quick access to the interior of the vacuum system. The present invention meets all of these requirements.

The present invention as a remotely controlled apparatus is particularly useful in particle accelerators, plasma devices, and the like, where a large amount of residual radioactivity is encountered. The seal may readily be operated without waiting for the radioactivity to decay to a safe level for human tolerance.

In a preferred form the invention comprises a closely-fitting disc assembly that is movable into the opening to be sealed. The annular inner surface of the opening is lined with a layer of soft metal and a slightly flexible annular band of relatively harder metal is disposed around the rim of the disc assembly, the band having inwardly extending lips which overlay the outer portions of the disc assembly at the two opposite faces thereof and which are secured thereto. The outer surface of the band is provided with serrations which bite into the soft metal lining of the opening upon expansion of the band.

To expand the band, a first annular inflatable metal element is disposed immediately beneath the band. In closing the seal, the disc assembly is positioned in the opening and the first inflatable element is expanded by admitting hydraulic fluid under pressure thereto. The pressure of the inflated element forces serrations of the flexible annular band into the soft metal lining of the wall of the opening, thereby providing a leak-proof seal.

To provide for releasing the seal, the disc assembly is formed of two disc members which are normally adjacent and which are joined by the band as described above. A second annular inflatable metal element is disposed in a groove between the two discs. By forcing hydraulic fluid into the second inflatable element, the two discs are moved apart sufficiently to stretch and radially contract the annular band. Such motion withdraws the serrations of the band from the lining of the opening sufficiently that the disc assembly may be removed from the wall opening.

Accordingly, it is an object of this invention to provide a closure seal for use in ultrahigh vacuum systems.

Another object of the invention is to provide a vacuum seal which may be heated without damage thereto.

A further object of this invention is to provide a vacuum sealing closure mechanism that is rapidly engaged and disengaged.

A still further object of this invention is to provide a sealing apparatus that can readily be engaged and disengaged from a remote location.

A further object of the invention is to provide a simple, economical and durable vacuum sealing closure forming a substantially leakage free positive seal.

It is another object of the invention to provide a mechanism for closing access openings in vacuum vessels which is readily adaptable to large sized openings.

It is still another object of this invention to provide a closure device for vacuum wall openings which does not require that bulky mechanism be mounted at the opening.

Figure 2:
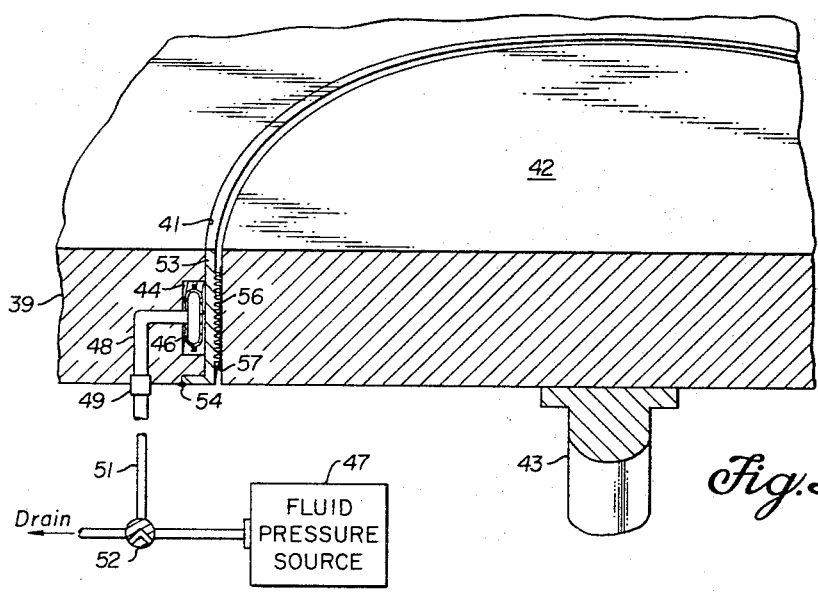

The invention, together with further objects and advantages thereof, will be better understood by reference to the following specification together with the accompanying drawing, of which:

FIGURE 1 is an axial section view showing one embodiment of the sealing apparatus in position in a vacuum wall opening, and FIGURE 2 is a section view of a second embodiment of the sealing apparatus.

Referring now to FIGURE 1, there is shown a wall section 11 of a vacuum enclosure having an access opening 12 therein. The opening 12 is preferably tapered with the larger diameter end away from the inner or vacuum side 10. Although opening 12 is circular in this example, it will be apparent that the invention may be adapted to openings of differing configuration.

A sealing disc assembly 13, which conforms to the shape of opening 12, is disposed thereat. Sealing disc 13 is fabricated with two main parts; an inner plate 14 and a thicker outer plate 16, the plates being parallel, coaxial and normally adjacent. Disc assembly 13 is moved into and out of access opening 12 along the axis thereof by means of a projecting axial stem 17 which may be coupled to a hydraulic drive cylinder 18. Other means such as a threaded rotatable screw drive may be employed to move disc assembly 13 into and out of opening 12, it being desirable that the means be capable of exerting a substantial force.

Disposed around the periphery of disc assembly 13 is a flexible annular band 19 which has an inwardly directed lip 20 at each end that overlays the rims of plates 14 and 16 and is secured thereto. Band 19 is secured at the lip 20 on the pressured side with a seam weld 15 or similar seal to prevent leakage therethrough. On the outer surface of flexible band 19 are numerous annular serrations 21. An annular lining of soft metal 22 is provided around the wall of opening 12, adjacent to the serrations 21 of band 19. By providing for pressing the serrations 21 of annular band 19 against the soft metal of insert 22, a pressure seal is formed.

The use of the soft metal lining 22 is optional and in the event lining 22 is not utilized, the serrations 21 of band 19 may press directly against the wall 11 of the enclosure. However, repeated pressing of the serrations 21 against the wall 11 of the enclosure eventually requires resurfacing of the wall whereas the soft metal lining 22 is expandable and may be replaced as needed.

In one embodiment of the invention, copper is used for the lining 22 and stainless steel is utilized for the flexible annular band 19. Other metal combinations can be used, such as Inconel, provided the annular band 19 has sufficient flexibility. Instead of a copper strip insert 22, a vapor deposit of the metal on the sealing surface has been found to work satisfactorily, although, after repeated closures the copper will work-harden. A vapor deposit of silver will last for up to one hundred closings.

An expandable means is required to press flexible band 19 outwardly from disc 13 to form the seal. This movement is provided by a first flexible inflatable annular element 23 which may be formed, for example, by edge welding two flat metal concentric rings together. Element 23 is disposed in an annular groove 24 on the periphery of plate 16 beneath the band 19. Radial expansion of element 23 presses band 19 outwardly against the metal insert 22. To provide for such expansion and contraction, the inflatable element 23 is connected to a hydraulic fluid pressure source 26, as will hereinafter be described in greater detail, through a passage 27 that extends radially within plate 16 and then axially through stem 17 to a fitting 30 at one side thereof. The fluid pressure is maintained during the sealing operation and is released when the seal is broken.

To break the seal formed by the expansion of element 23, a second inflatable annular element 31 is disposed in an annular groove 32 on the planar surface of plate 16 which is adjacent to plate 14. The second inflatable element 31 is selectively connectable with the hydraulic fluid pressure source 26 through a passage 33, within plate 16 and stem 17, that parallels passage 27 and terminates at a second fitting 35 on the side of the stem 17. By expanding element 31, as will be described, plate 16 is forced away from plate 14 thereby stretching band 19 and retracting serrations 21 from wall lining 22.

The hydraulic fluid pressure 26 source may typically consist of a reservoir 28 for receiving the hydraulic fluid which in this case is a liquid. The reservoir 28 connects to the intake side of a pump 29, which discharges to a two-way, four-port valve 34. Separate outlets of the valve 34 are connected to the first and second fittings 30 and 35 through a pair of flexible hoses 36, 37, respectively that allow movement of the stem 17. Thus high pressure fluid from pump 29 may be selectively directed to either element 23 or element 31 by operation of valve 34. Valve 34 has an additional pair of positions for selectively connecting either element 23 or 31 to the reservoir 28 when the pressure is to be relieved and the elements deflated.

In operation, hydraulic cylinder 18 is operated to position disc 13 in the opening 12 in wall 11. By operation of valve 34, hydraulic fluid is admitted from source 26 to element 23. The consequent expansion of element 23 causes flexible band 19 to bear forcibly against copper lining 22. The serrations on band 19 bite into the soft metal of the lining 22, thus forming a seal. The apparatus is then heated to drive out any occluded gases contained therein, techniques for such outgassing being well understood in vacuum technology.

The seal is broken by releasing the hydraulic pressure in element 23 by means of valve 34 thereby draining the fluid to reservoir 28, and deflating the element 23. Hydraulic fluid is then admitted to element 31 by operation of the valve 34, thereby inflating the element. The expanding element 31 pushes against plate 14 which, in turn, pulls against flexible band 19. The band 19 stretches, retracts inwardly and straightens out, and, in so doing, withdraws the serrations 21 from lining 22. The sealing disc assembly 13 is then easily removed from the wall opening 12 by drive cylinder 18.

In some instances, the expandable element, high pressure fluid feed, and associated structure may be disposed within the vacuum wall rather than the movable disc. Thus in FIGURE 2 there is shown a further embodiment of the present invention, including a wall section 39 of a vacuum enclosure, having an access opening 41. A unitary sealing disc 42 is shaped to conform to opening 41 and disposed therein. Disc 42 is moved into and out of opening 41 by an axial drive shaft 43 connected to suitable drive means which may be similar to that described with reference to FIGURE 1. A circumferential groove 44 is formed in the wall section 39 within opening 41 adjacent to the sealing disc 42. Disposed in the groove 44 is an inflatable annular element 46 which is coupled to a fluid pressure source 47 through an interior conduit 48 in wall 39, fitting 49, and an exterior conduit 51. A two-way, three-port valve 52 is disposed between fitting 49 and source 47 and is used to inflate and to deflate element 46 by introducing or releasing high pressure fluid from source 47.

On the side of the element 46 toward the sealing disc 42 is a flexible annular stainless steel band 53 which is attached to wall section 39 by a circumferential seam weld 54 at the outer face of wall 39. Weld 54 prevents leakage between wall 39 and band 53.

In the operation of the apparatus of FIGURE 2, the expansion of element 46 forms a seal between band 53 and disc 42. To provide for positive vacuum sealing, serrations 56, similar to those used in the flexible band 19 of the apparatus in FIGURE 1, are provided on flexible band 53. A vapor-deposited metal lining 57 is coated on the periphery of sealing disc 42, which coating 57 is used as the sealing surface in which the serrations 56 are imbedded upon expansion of element 46. Copper and silver have been used for the vapor-deposited metal 57, however, copper work hardens after several sealings, a drawback that a deposited silver layer does not have.

While the invention has been described with respect to specific embodiments, numerous modifications and variations are possible within the spirit and scope of the invention, and thus it is not intended to limit the invention except as defined in the following claims.

What is claimed is:

1. A pressure-actuated apparatus for closing an opening in a vacuum wall comprising:
    (a) a closure disc fittable into said opening,
    (b) an annular inflatable element disposed around the periphery of said disc,
    (c) an annular flexible band disposed around the periphery of said disc and encircling said inflatable element, said band having a continuous serrated region around the outer surface thereof,
    (d) a source of high pressure fluid, and
    (e) means for selectively coupling said source of fluid to said inflatable element whereby said band is flexed outwardly causing said serrated region to bear against the wall of said opening.

2. Apparatus as described in claim 1, wherein said disc, band, and inflatable element are formed of heat resistant material.

3. Mechanism for closing an opening in a wall having a pressure differential between opposite sides thereof, comprising:
    (a) a disc fittable into said opening and having a circumferential groove formed thereon,
    (b) an annular inflatable element contained in said peripheral groove,
    (c) an annular flexible metal band with serrations on the outer surface thereof, said band being disposed on said disc outwardly from said inflatable element, and
    (d) a fluid pressure source coupled to said inflatable element whereby inflation of said element causes the serrations of said band to forcibly bear against the sealing surface of said opening.

4. A pressure-actuated mechanism for closing an opening in the wall of a vacuum enclosure comprising:
    (a) a closure disc shaped to conform to said opening and having a circumferential groove,
    (b) an annular inflatable element disposed in said groove on said disc,
    (c) an annular flexible band with a plurality of serrations on the outer surface thereof, said band being disposed on the periphery of said disc and being sealingly secured thereto around one edge of said band, and
    (d) fluid pressure source selectively connectable with said inflatable element whereby selectively adding fluid pressure to said inflatable element causes said serrations of said metal band to press against said vacuum wall enclosure.

5. A sealing device for an opening in a vacuum wall comprising, in combination:
    (a) a closure element having first and second parallel plates fittable into said opening,
    (b) an annular radially flexible band encircling the rims of said first and second plates and engaged by each thereof whereby said band may be stretched axially by moving said plates apart,
    (c) first inflatable means disposed between said band and said plates for flexing said band radially outwardly to bear against the wall of said opening, and
    (d) second inflatable means disposed between said plates for stretching said band axially to retract said band from said wall of said opening.

6. A fluid pressure-actuated mechanism for closing an opening in the wall of a vacuum enclosure, comprising:
    (a) first and second coaxial and contiguous sealing discs, fittable into said opening, said first disc having a circumferential groove formed in the periphery thereof,
    (b) first annular inflatable means contained in said groove of said first disc,
    (c) second annular inflatable means disposed between said first and second disc,
    (d) a flexible endless metal band with serrations on the outer surface thereof disposed on the periphery of said discs and encircling the exposed edges of said disc,
    (e) a source of high pressure fluid, and
    (f) means for selectively coupling said fluid to said first inflatable means to cause said first inflatable means to expand outwardly, whereby the serrations of said band press against said vacuum wall, and for sequentially deflating said first inflatable means and subsequently pressurizing said second inflatable means whereby inflation of said second inflatable means separates said first and second discs and thus retracts said serrations from said wall.

7. Apparatus as described in claim 6, wherein said first and second annular inflatable means are each comprised of a pair of contiguous coaxial metal bands joined together along the edges thereof.

8. Apparatus as described in claim 6, wherein a soft metal lining is disposed on said wall of the vacuum enclosure in said opening for receiving said serrations.

9. Apparatus as described in claim 6, wherein a vapor-deposited soft metal lining is disposed on the sealing surface of the wall of said vacuum enclosure opening.

10. A fluid-pressure operated mechanism for closing an opening in the wall of a vacuum enclosure, comprising:
    (a) outer and inner coaxial and contiguous sealing discs, shaped to fit into said opening, said outer disc having a circumferential groove therearound,
    (b) drive means connected to said outer disc to move said discs into and away from said opening,
    (c) a first annular inflatable element disposed in said groove of said outer disc,
    (d) a flexible substantially flat annular band with a plurality of projecting coaxial serrations on the outer surface thereof encircling the exposed edges of said discs and overlaying the rims of the outer surfaces of each thereof,
    (e) a soft metal lining disposed on the wall of said opening of said vacuum enclosure,
    (f) a second annular inflatable element disposed between said first and second discs,
    (g) a high pressure fluid source, and
    (h) means for selectively coupling said fluid source to said first inflatable element, whereby introduction of said fluid pressure expands said first element and forces the serrations of said band into said soft metal lining, and for selectively deflating said first inflatable element and subsequently pressurizing said second inflatable element, thereby separating said first and second discs and stretching said band in the axial direction, whereby the serrations break contact with said soft metal lining.

11. Apparatus for closing an opening in a vacuum wall, which opening has a sealing surface with a groove formed therearound, comprising:
    (a) a closure member having an annular peripheral sealing surface shaped to fit into said opening,
    (b) expansible means disposed in said groove formed in said wall opening,
    (c) a flexible annular band disposed around said sealing surface of said opening against said expansible means, said band having at least one annular serration projecting toward the sealing surface of said closure member,
    (d) a soft metal lining disposed on the sealing surface of said closure member, and
    (e) a source of high pressure fluid coupled to said expansible means, whereby admitting said fluid to said expansible means flexes said band and said serrations into said soft metal.

12. Apparatus for closing an opening in a vacuum wall comprising:
    (a) a closure disc shaped to fit into said opening,
    (b) an annular metal band disposed in said opening between said vacuum wall and said closure disc, said metal band having a plurality of serrations projecting toward said disc and being sealingly attached to said wall along one edge,
(c) an annular inflatable element disposed in said opening between said wall and said metal band,
(d) a source of high pressure fluid, and
(e) means for selectively connecting said source of fluid with said annular inflatable element to flex said band towards said disc.

References Cited

UNITED STATES PATENTS

| | | | |
|---|---|---|---|
| 2,894,780 | 6/1954 | Hollander et al. | 294—93 |
| 3,151,650 | 10/1964 | Beck | 220—24.5 |

THERON E. CONDON, *Primary Examiner.*

JAMES B. MARBERT, *Examiner.*